United States Patent
Kaizu et al.

(10) Patent No.: US 7,368,184 B2
(45) Date of Patent: May 6, 2008

(54) MAGNETIC RECORDING MEDIUM AND MAGNETIC RECORDING DEVICE

(75) Inventors: Akimasa Kaizu, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 463 days.

(21) Appl. No.: 10/948,322

(22) Filed: Sep. 24, 2004

(65) Prior Publication Data

US 2005/0095402 A1    May 5, 2005

(30) Foreign Application Priority Data

Sep. 26, 2003  (JP)  ............... 2003-336077
Aug. 26, 2004  (JP)  ............... 2004-247378

(51) Int. Cl.
  *G03B 17/00*  (2006.01)
  *G11B 5/33*  (2006.01)
(52) U.S. Cl. .............. 428/828; 428/830; 360/135
(58) Field of Classification Search ........ 428/827, 428/828, 830, 692.1, 693.1, 900; 360/135, 360/136

See application file for complete search history.

(56) References Cited

U.S. PATENT DOCUMENTS

| | | | |
|---|---|---|---|
| 2003/0082407 A1* | 5/2003 | Sakawaki et al. | 428/829 |
| 2004/0131890 A1* | 7/2004 | Kikitsu et al. | 428/829 |
| 2004/0166372 A1* | 8/2004 | Haginoya et al. | 428/829 |

FOREIGN PATENT DOCUMENTS

JP   A 9-97419   4/1997

* cited by examiner

*Primary Examiner*—Carol Chaney
*Assistant Examiner*—Louis Falasco
(74) *Attorney, Agent, or Firm*—Oliff & Berridge, PLC

(57) ABSTRACT

A magnetic recording medium which has a high areal density and reduced power consumption for recording operations, and a magnetic recording device incorporating the magnetic recording medium. The magnetic recording medium has an upper soft magnetic layer formed uniformly along a plane including the upper surface of a recording layer over the convex and concave portions of a concavo-convex pattern in the recording layer.

3 Claims, 12 Drawing Sheets

MAGNETIC RECORDING MEDIUM AND MAGNETIC RECORDING DEVICE

BACKGROUND OF THE INVENTION

1. Field of the Invention

The present invention relates to a magnetic recording medium with a recording layer having a concavo-convex pattern and to a magnetic recording device including the magnetic recording medium.

2. Description of the Related Art

Conventionally, magnetic recording media such as hard discs have been frequently used as recording media for computers or the like. Recently, the magnetic recording media which have a large storage capacity have also received attention as recording media, e.g., for domestic electric appliances, cellular phones, and PDAs (Personal Digital Assistants).

As the magnetic recording media have been widely used, there is an increasing demand for such a magnetic recording medium that requires reduced power consumption for recording operations. In addition, although attempts have been made one after another to improve the areal density of the magnetic recording medium, there is still an increasing demand for further improved areal densities because of requirements for further reduction in size and increase in storage capacity.

Conventionally, the magnetic recording medium has been improved in areal density, e.g., by reducing the size of constituent magnetic particles of the recording layer, refining the materials thereof, and increasing the level of the micro-machining of heads. However, problems such as side-fringes or crosstalk resulting from the limitation of the machining of heads or the spreading of magnetic fields have come to the surface, so that the conventional ways of improving the areal density have reached their limits.

In contrast to this, several magnetic recording media have been suggested as candidates for the magnetic recording medium that can further improve the areal density. The media include discrete track media or patterned media which have the recording layer having a concavo-convex pattern (e.g., see Japanese Patent Laid-Open Publication No. Hei 9-97419).

The recording layer having a concavo-convex pattern makes it easier for a recording magnetic field from a magnetic head to concentrate on the convex portions that are designed to serve as a recording area. This allows for reducing a recording current flowing through the magnetic head for generating the recording magnetic field, thereby reducing power consumption.

Furthermore, the convex portions or recording areas being spaced apart from each other possibly prevent information from being recorded onto adjacent recording areas and cause crosstalk to unlikely occur, thereby allowing for improving the areal density.

However, the demands for further reduction in size of recording devices and recording media and for increase in storage capacity know no limits. Even the discrete track media and the patterned media designed to improve the areal density by patterning the recording layer to have a concavo-convex pattern are also required to provide still further improved areal densities and reduced power consumption for recording operations.

SUMMARY OF THE INVENTION

In view of the foregoing problems, various exemplary embodiments of this invention provide a magnetic recording medium which has a high areal density and reduced power consumption for recording operations, and a magnetic recording device including the magnetic recording medium.

According to one exemplary embodiment of the present invention, the recording layer has a concavo-convex pattern and a soft magnetic layer is formed over the upper surface of the recording layer, thereby providing a solution to the aforementioned problems. That is, the recording layer having a concavo-convex pattern and provided with a soft magnetic layer over the upper surface thereof will cause the magnetic head to apply a magnetic field at an increased intensity to the surface of the recording medium, thereby allowing for reducing power consumption for recording operations.

The soft magnetic layer is preferably formed uniformly over the convex and concave portions of the concavo-convex pattern along a plane including the upper surface of the recording layer.

This will be described briefly below.

As described above, the magnetic recording media such as discrete track media and patterned media are designed to have the recording layer having a concavo-convex pattern to avoid recording information onto adjacent convex portions and reduce crosstalk between convex portions, thereby increasing the areal density.

In the course of achieving the present invention, the inventors found the following fact in applying a recording magnetic field from a magnetic head to one of the convex portions of the recording layer. That is, the distribution of the recording magnetic field tends to be most intense in the vicinity of the convex portion and quickly become less intense with distance from the convex portion; however, the magnetic field also tends to concentrate at a neighboring convex portion, causing the recording magnetic field to be more intense at the neighboring convex portion than at a neighboring concave portion. That is, it was found that the distribution of the recording magnetic field becomes less intense with distance from the convex portion not monotonously but in such a manner that the recording magnetic field becomes more intense at the neighboring convex portion than in its surroundings.

Although the effects of preventing information from being recorded onto the neighboring convex portion and reducing crosstalk between convex portions are provided by forming the recording layer in the concavo-convex pattern, such an increase in intensity of the recording magnetic field at the neighboring convex portion will cancel out these effects by the amount corresponding to the increase.

The inventors conducted intensive studies on this point and found that an increase in intensity of the recording magnetic field at the neighboring convex portion relative to its surroundings could be prevented or significantly reduced by forming a soft magnetic layer not only over the convex portions the concavo-convex pattern in the recording layer but also uniformly over the concave and convex portions of the concavo-convex pattern along a plane including the upper surface of the recording layer. This makes it possible to provide a further improved areal density.

It has not yet been made clear why the recording magnetic field becomes intense not only at the convex portion located immediately below a magnetic head but also at other neighboring convex portions. However, it is conceivable that the magnetism-bearing recording layer being formed in the concavo-convex pattern causes changes in magnetism as well as in shape in the vicinity of the end portion of the convex portion, which causes the recording magnetic field to likely concentrate in the vicinity of the end portion of the neighboring convex portion, thereby the recording magnetic field becomes more intense at the neighboring convex portion than its surroundings. In contrast to this, it is conceivable that a soft magnetic layer being formed uniformly over the concave and convex portions of the concavo-convex pattern along a plane including the upper surface of the recording layer serves to alleviate a change in magnetism in the vicinity of the end portion of the convex portion, thereby allowing for preventing or significantly reducing an increase in intensity of the recording magnetic field at the neighboring convex portion relative to its surroundings.

Accordingly, various exemplary embodiments of the invention provide a magnetic recording medium with a recording layer formed in a predetermined concavo-convex pattern, wherein a soft magnetic layer is formed over an upper surface of the recording layer; perpendicular-recording Various exemplary embodiments of the invention provide a magnetic recording device comprising: the magnetic recording medium and a magnetic head for recording and reading operations on the magnetic recording medium.

As used herein, the term "the upper surface of a recording layer" refers to the surface of the recording layer opposite to a substrate, not necessarily referring to an upper side surface of the recording layer in actual service conditions. Likewise, the term "the upper soft magnetic layer" refers to a soft magnetic layer formed on the side opposite to the substrate of the recording layer, whereas the term "the lower soft magnetic layer" refers to a soft magnetic layer formed on the substrate side of the recording layer.

Furthermore, as used herein, the term "the magnetic recording medium" refers to not only hard discs, floppy(a trade mark) discs, or magnetic tapes, which make use of only magnetism for recording or reading information but also magneto-optical recording media such as MOs (Magneto-Optical) which make use of magnetism and beams of light in combination, and heat-assisted recording media which make use of magnetism and heat in combination.

According to the various exemplary embodiments of the present invention, the recording layer being formed in a concavo-convex pattern allows for increasing its areal density. Additionally, a soft magnetic layer being formed over the upper surface of the recording layer allows for increasing the magnetic field applied by a magnetic head to the surface of the recording medium, thereby reducing power consumption for recording operations. Furthermore, a soft magnetic layer being formed uniformly over the concave and convex portions of the concavo-convex pattern along a plane including the upper surface of the recording layer allows for preventing a recording magnetic field from becoming more intense in a convex portion adjacent to the convex portion to record information on than in its surroundings, and for avoiding recording information onto the neighboring convex portion and reducing crosstalk. This makes it possible to improve areal densities, and realize reduction in size of the magnetic recording medium and increase in storage capacity.

DETAILED DESCRIPTION OF THE PREFERRED EMBODIMENTS

Now, preferred exemplary embodiments of the present invention will be described below in more detail with reference to the accompanying drawings.

Figure 1:
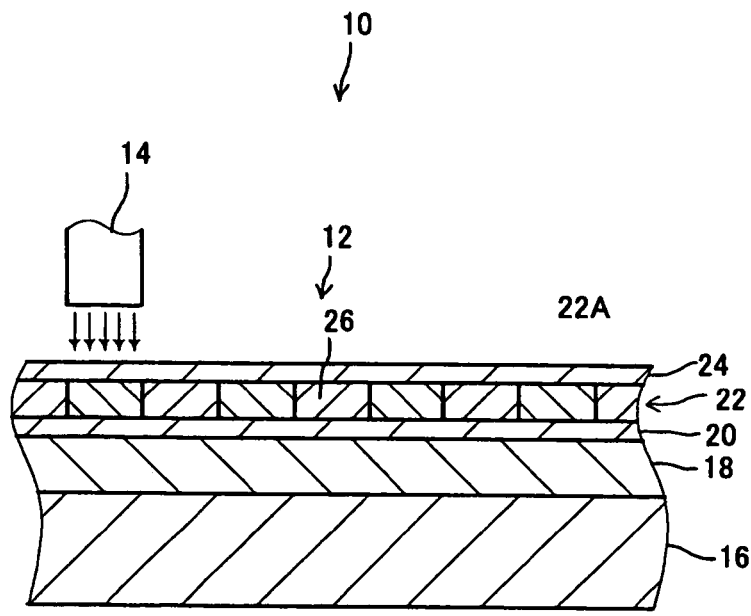
FIG. 1 is a cross-sectional schematic view showing the structure of a magnetic recording device according to a first exemplary embodiment of the present invention.

As shown in FIG. 1, a magnetic recording device 10 according to a first exemplary embodiment of the present invention includes a magnetic recording medium 12 and a magnetic head 14.

The magnetic recording medium 12 is a perpendicular-recording discrete-track type magnetic disc, configured such that a lower soft magnetic layer 18, an intermediate layer 20, a recording layer 22, and an upper soft magnetic layer 24 are formed over a substrate 16 in that order.

The recording layer 22 is divided into a number of recording elements (recording tracks) 22A, and a non-magnetic substance 26 is filled in between the recording elements 22A.

The substrate 16 is made of a non-magnetic material such as glass, Al (aluminum), Si (silicon), glassy carbon, or resin.

The lower soft magnetic layer 18 is 50 to 300 nm in thickness and made of an alloy of an iron-group element such as an Fe (iron) alloy, a Ni (nickel) alloy, or a Co (cobalt) alloy.

The intermediate layer 20 is 5 to 20 nm in thickness and made of Cr, a non-magnetic CoCr alloy, Ti (titanium), MgO (magnesium oxide) or the like.

The recording layer 22 is 5 to 30 nm in thickness and made of a CoCr (Cobalt—chromium) alloy, aligned to be magnetized in the direction of thickness. The recording layer 22 is divided radially in the data area, and the recording elements 22A are arranged side by side with a constant pitch concentrically in the form of circular segments. The recording layer 22 is also formed in a predetermined servo signal pattern in the servo area; however, this is not particularly necessary to understand the present invention and therefore not illustrated.

The upper soft magnetic layer 24 is 0.2 to 5 nm in thickness and made of an alloy of an iron-group element such as an Fe (iron) alloy, a Ni (nickel) alloy, a Co (cobalt) alloy, like the lower soft magnetic layer 18. More specifically, for example, the upper soft magnetic layer 24 may be made of the materials indicated in the Table 1 and 2 below or a material of those stacked in layers. The upper soft magnetic layer 24 is formed uniformly over the convex and concave portions of a concavo-convex pattern along a plane including the upper surface of the recording layer 22.

TABLE 1

| | Constituent Element | | Content Ratio (weight %) |
|---|---|---|---|
| Fe based | Fe | a | $95 \leq a \leq 100$ (a + b = 100) |
| | M (M: Al, Si, Mo) | b | $0 \leq b \leq 5$ |
| Fe—Ni based | Fe | a | $20 \leq a \leq 50$ (a + b + c = 100) |
| | Ni | b | $50 \leq b \leq 79$ |
| | M (M: Mo, Cr, Cu, Nb, Ta) | c | $0 \leq c \leq 5$ |
| Fe—N based | Fe | a | $95 \leq a \leq 99$ (a + b + c = 100) |
| | N | b | $0.5 \leq b \leq 5$ |
| | M (M: Mo, Cr, Cu, Nb, Ta) | c | $0.5 \leq c \leq 5$ |

TABLE 1-continued

| | Constituent Element | | Content Ratio (weight %) | |
|---|---|---|---|---|
| Fe—Co based | Fe | a | $50 \leq a \leq 85$ | $(a + b + c = 100)$ |
| | Co | b | $30 \leq b \leq 50$ | |
| | M (M: Mo, Cr, Cu, Nb, Ta) | c | $0 \leq c \leq 5$ | |
| Fe—Co based | Fe | a | $23 \leq a \leq 40$ | $(a + b + c = 100)$ |
| | Co | b | $7 \leq b \leq 25$ | |
| | Ni | c | $40 \leq c \leq 70$ | |
| Fe—Al based | Fe | a | $70 \leq a \leq 95$ | $(a + b + c = 100)$ |
| | Al | b | $2 \leq b \leq 10$ | |
| | Si | c | $0 \leq c \leq 4$ | |

TABLE 2

| | Constituent Element | | Content Ratio (at %) | |
|---|---|---|---|---|
| Co based | Co | a | $70 \leq a \leq 85$ | $(a + b + c = 100)$ |
| | Zr | b | $5 \leq b \leq 15$ | |
| | Nb | c | $5 \leq c \leq 15$ | |
| Co based | Co | a | $70 \leq a \leq 85$ | $(a + b + c = 100)$ |
| | Ta | b | $5 \leq b \leq 15$ | |
| | Nb | c | $5 \leq c \leq 15$ | |

The non-magnetic substance 26 is made of a non-magnetic material such as $SiO_2$ (silicon oxide).

The magnetic head 14 is provided with an MR element and located in close proximity to the surface of the magnetic recording medium 12, and constituted to convert an electric signal to a magnetic signal in order to apply a recording magnetic field in the direction of thickness of the magnetic recording medium 12. The magnetic head 14 is also designed to detect the magnetic signals indicative of the information recorded in the magnetic recording medium 12 to convert them into electric signals.

Now, the operation of the magnetic recording device 10 will be explained below.

First, an explanation is given to how information is recorded on the magnetic recording medium 12.

First, the magnetic head 14 is brought into close proximity to one of the recording elements 22A in the recording layer 22, on which information is to be recorded. When the magnetic head 14 applies a recording magnetic field in the direction of thickness of the magnetic recording medium 12, the recording magnetic field is increased in directivity in the direction of thickness (perpendicular direction) by means of the lower soft magnetic layer 18 and then applied to the target recording element 22A. The upper soft magnetic layer 24, which is also magnetized at this time, causes the recording magnetic field to be enhanced and then applied to the recording element 22A, thus information is magnetically recorded onto the recording element 22A. Since the recording magnetic field from the magnetic head 14 can be enhanced and then applied to the recording element 22A in this manner, a recording current through the magnetic head 14 for generating a recording magnetic field can be reduced by that amount.

Furthermore, since the recording elements 22A are formed discontinuously, the recording layer 22 changes in magnetism as well as in shape in the vicinity of the end portion of the recording elements 22A. However, the upper soft magnetic layer 24 is formed over the convex and concave portions of the concavo-convex pattern of the recording layer 22 uniformly along a plane including the upper surface of the recording layer 22. This alleviates the change in magnetism in the vicinity of the end portion of the recording elements 22A, thereby preventing or significantly reducing an increase in intensity of the recording magnetic field at another recording element 22A adjacent to the recording element 22A to record information on relative to its surroundings. Therefore, the distribution of the recording magnetic field is most intense in the vicinity of the recording element 22A to record information on and rapidly and monotonously becomes weak with distance from this recording element 22A, thus preventing or significantly reducing to record information accidentally onto neighboring recording elements 22A. In other words, it can be ensured to record information onto a target recording element 22A, even if the recording elements 22A are arranged in such a closely spaced apart relation, thus improving the areal density.

Now, an explanation is given to how to read the information stored in the magnetic recording medium 12.

When the magnetic head 14 is brought into close proximity to one of the recording elements 22A in the recording layer 22 to read information thereon, the magnetic head 14 senses the magnetic field given by the recording element 22A to convert it into an electric signal. At this time, the magnetic field given by the recording element 22A is slightly directed in the direction along the surface due to the upper soft magnetic layer 24, causing the magnetic field detected by the magnetic head 14 to be weakened by that amount. However, the upper soft magnetic layer 24 being 5 nm or less in thickness causes the magnetic field given by the recording element 22A to be restricted to only a slight extent in directivity in the direction of the surface, thereby ensuring that the magnetic head 14 senses the magnetic field given by the recording element 22A.

That is, the magnetic recording medium 12 requires only a small amount of power consumption for sufficient recording of information, ensuring the recording and reading of information at a high areal density.

Now, a second exemplary embodiment of the present invention will be described below.

Figure 2:
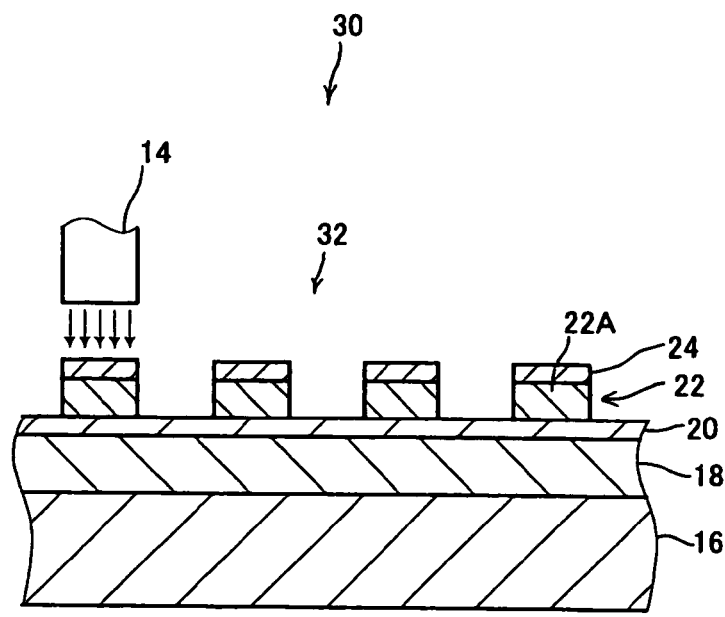
FIG. 2 is a cross-sectional schematic view showing the structure of a magnetic recording device according to a second exemplary embodiment of the present invention.

As shown in FIG. 2, a magnetic recording device 30 according to the second exemplary embodiment includes a magnetic recording medium 32 which is different from the magnetic recording medium 12 according to the first exemplary embodiment in that the upper soft magnetic layer 24 is formed only over the upper surface of the recording elements 22A (convex portions) with the upper soft magnetic layer 24 being eliminated on the concave portions between the recording elements 22A. No non-magnetic substance is filled in the concave portions between the recording elements 22A. The other structure is the same as that of the magnetic recording device 10 according to the first exemplary embodiment and thus will not be repeatedly explained only with the same reference symbols as those of FIG. 1 being given thereto.

In the magnetic recording device 30, the upper soft magnetic layer 24 is formed over the upper surface of the recording elements 22A in the magnetic recording medium 32. Thus, like the magnetic recording device 10 according to the first exemplary embodiment, the upper soft magnetic layer 24 causes the recording magnetic field from the magnetic head 14 to be enhanced and then applied to the recording elements 22A, thus allowing a recording current through the magnetic head 14 for generating a recording magnetic field to be reduced by that amount.

Now, a third exemplary embodiment of the present invention will be described below.

Figure 3:
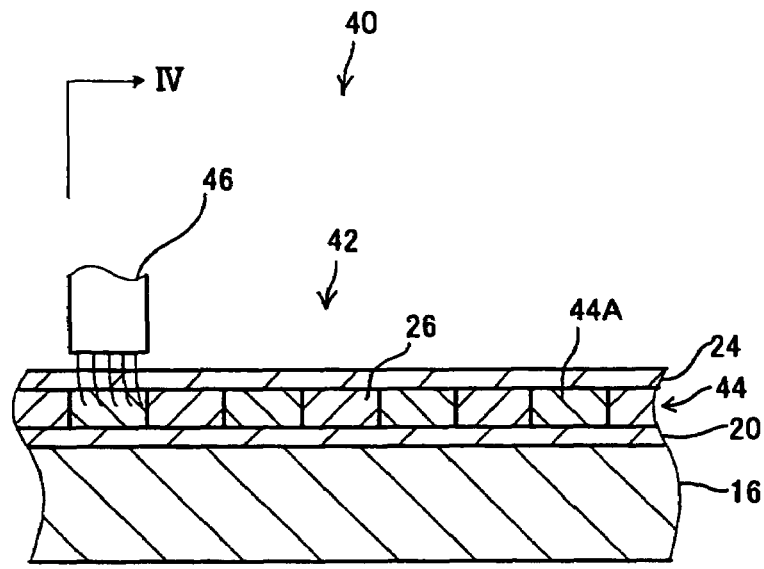
FIG. 3 is a cross-sectional schematic view showing the structure of a magnetic recording device according to a third exemplary embodiment of the present invention.
Figure 3:
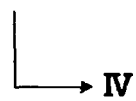
Figure 4:
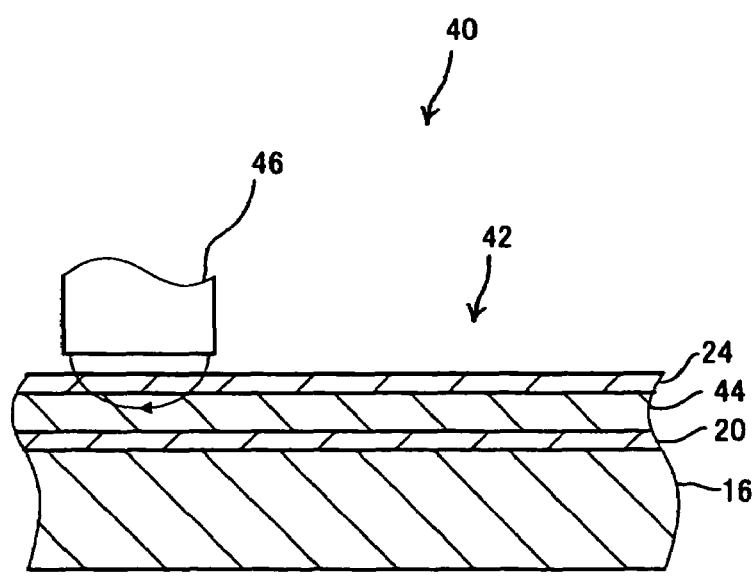
FIG. 4 is a sectional view taken along the line IV-IV of FIG. 3.

As shown in FIGS. 3 and 4, a magnetic recording device 40 according to the third exemplary embodiment is characterized by being of a longitudinal recording type that a recording layer 44 of a magnetic recording medium 42 is magnetized in the direction along the surface in contrast to the recording layer 22 of the magnetic recording medium 12 according to the first exemplary embodiment. The lower soft magnetic layer is not provided between the recording layer 44 and the substrate 16. In contrast to the magnetic head 14 according to the first exemplary embodiment, a magnetic head 46 is designed to apply a recording magnetic field in the direction along the surface of the magnetic recording medium 42. The other structure is the same as that of the first exemplary embodiment and thus will not be repeatedly explained only with the same reference symbols as those of FIG. 1 being given thereto.

The magnetic recording device 40 also has the upper soft magnetic layer 24 formed uniformly over the concave and convex portions of the concavo-convex pattern of the recording layer 44 along a plane including the upper surface of the recording layer 44. This alleviates a change in magnetism in the vicinity of the end portion of a recording element 44A and thus prevents or significantly reduces information to be accidentally recorded onto neighboring recording elements 44A, thereby making it possible to provide an improved areal density.

Figure 5:
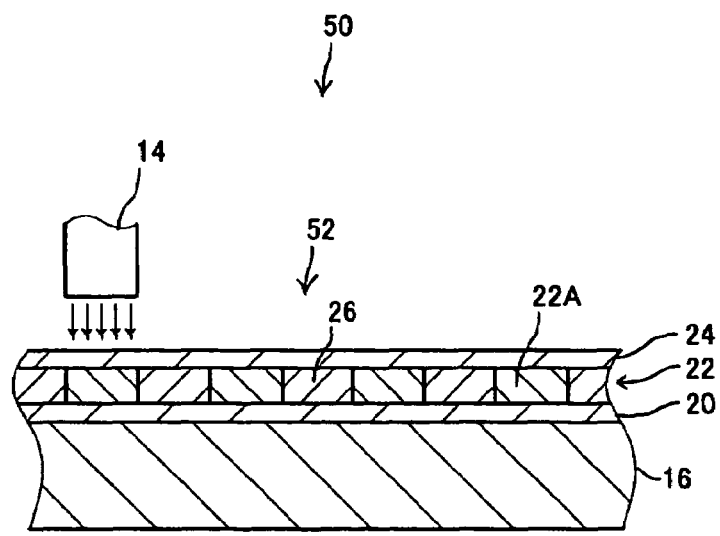
FIG. 5 is a cross-sectional schematic view showing the structure of a magnetic recording device according to a fourth exemplary embodiment of the present invention.

In the first and second exemplary embodiments, the magnetic recording media 12, 32 are perpendicular-recording type discrete track media in which the lower soft magnetic layer 18 and the intermediate layer 20 are formed under the recording layer 22; however the arrangement of layers below the recording layer 22 may be changed as appropriate depending on the type of the magnetic recording medium. For example, the present invention is also applicable to a perpendicular-recording type discrete track medium having no lower soft magnetic layer 18, like a magnetic recording medium 52 of a magnetic recording device 50 according to a fourth exemplary embodiment of the present invention shown in FIG. 5. In this case, it is also possible to reduce power consumption at the magnetic head and provide an improved areal density. The intermediate layer 20 may also be eliminated. Each layer may also be formed of a plurality of layers. Another layer may also be formed between the substrate 16 and the recording layer 22 in addition to the lower soft magnetic layer 18 and the intermediate layer 20. Alternatively, the recording layer 22 may be formed directly on the substrate 16.

On the other hand, in the third exemplary embodiment, the magnetic recording medium 42 is a longitudinal recording type discrete track medium in which the intermediate layer 20 is formed between the substrate 16 and the recording layer 44; however, for example, the present invention is also applicable to a longitudinal recording type discrete track medium in which another layer is formed between the substrate 16 and the recording layer 44 depending on the type of the magnetic recording medium. Alternatively, the recording layer 44 may be formed directly on the substrate 16.

In the first through third exemplary embodiments, the upper soft magnetic layer 24 is directly formed on the upper surface of the recording layer 22, 44. However, for example, a layer of a predetermined non-magnetic material may also be formed between the upper soft magnetic layer 24 and the recording layer 22, 44, the upper soft magnetic layer 24 may be formed indirectly over the upper surface of the recording layer 22 or 44 via the non-magnetic material layer.

Furthermore, in the first and third exemplary embodiments, the non-magnetic substance 26 is filled in between the recording elements 22A or 44A, and the upper soft magnetic layer 24 is formed uniformly over the recording elements 22A or 44A (the convex portions of the concavo-convex pattern) and the non-magnetic substance 26 (the concave portions of the concavo-convex pattern). However, the recording layer 22 or 44 may be formed in a hollow structure in which no non-magnetic substance is filled in between the recording elements 22A or 44A, so that the upper soft magnetic layer 24 is formed uniformly over the recording elements 22A or 44A and the concave portions between the recording elements 22A or 44A.

On the other hand, in the second exemplary embodiment, no non-magnetic substance is filled in the concave portions between the recording elements 22A. However, the non-magnetic substance may also be filled in the concave portions between the recording elements 22A, with the upper soft magnetic layer 24 formed only over the recording elements 22A. Even in this case, the upper soft magnetic layer 24 causes a recording magnetic field to be enhanced and then applied to the recording elements 22A, thereby allowing the recording current through the magnetic head 14 for generating the recording magnetic field to be reduced by that amount.

In the first through third exemplary embodiments, the recording layers 22, 44 are made of a CoCr alloy. However, for example, the recording layer may also be formed of another material such as another alloy including an iron-group element (Co (cobalt), Fe (iron), and Ni (nickel)) or those stacked in layers.

In the first through third exemplary embodiments, all the magnetic recording media 12, 32, and 42 have the upper soft magnetic layer 24 formed at their uppermost surface; however, another layer such as a protective layer or a lubricating layer may be further formed over the upper soft magnetic layer 24 as required.

In the first through third exemplary embodiments, all the magnetic recording media 12, 32, and 42 are single-side recording type media in which the recording layer 22, 44 or the like is formed on a single side of the substrate 16; however, the present invention is also applicable to a magnetic recording medium of a double-side recording type in which the recording layer or the like are formed on both sides of the substrate 16.

In the first through third exemplary embodiments, all the magnetic recording media 12, 32, and 42 are magnetic discs of the discrete track type in which the recording elements 22A or 44A are formed side by side at fine intervals in the data area in the radial direction of the tracks; however, the present invention is also applicable to a magnetic disc in which the recording elements are formed side by side at fine intervals in the circumferential direction of the tracks (in the direction of the sectors), a magnetic disc in which the recording elements are formed side by side at fine intervals in both the radial and circumferential directions of the tracks, and a magnetic disc having recording elements formed in a spiral fashion.

In the first through third exemplary embodiments, all the magnetic recording media 12, 32, and 42 have a structure in which the recording layer 22 or 44 is completely divided into the recording elements 22A or 44A which are independent of each other; however, the present invention is also applicable to a magnetic recording medium having a structure in which the recording layer is partially divided and recording elements are contiguous partly or to a magnetic recording medium configured to have a continuous recording layer formed in a concavo-convex pattern having contiguous convex and concave portions.

SIMULATION EXAMPLE 1

In accordance with the first exemplary embodiment, a simulation model of the magnetic recording device 10 was prepared which had the perpendicular-recording type magnetic recording medium 12. More specifically, the conditions of the simulation model were defined as follows:

Track pitch of the recording layer 22 in the magnetic recording medium 12=200 nm (the side-by-side radial pitch of the recording elements 22A);

Radial width of the recording element 22A=100 nm;

Radial width of a concave portion between the recording elements 22A=100 nm;

Thickness of the recording layer 22=25 nm;

Thickness of the upper soft magnetic layer 24=5 nm;

Saturation magnetization of the upper soft magnetic layer 24=1.4 T;

Thickness of the intermediate layer 20=5 nm;

Thickness of the lower soft magnetic layer 18=200 nm;

Saturation magnetization of the lower soft magnetic layer 18=1.0 T;

Width of the recording magnetic pole of the magnetic head 14=100 nm;

Magneto-motive force applied to the magnetic head 14=0.12 AT; and

Flying height of the magnetic head 14=15 nm (the height by which the magnetic head 14 is spaced apart from the surface of the upper soft magnetic layer 24 in the magnetic recording medium 12).

Figure 6:
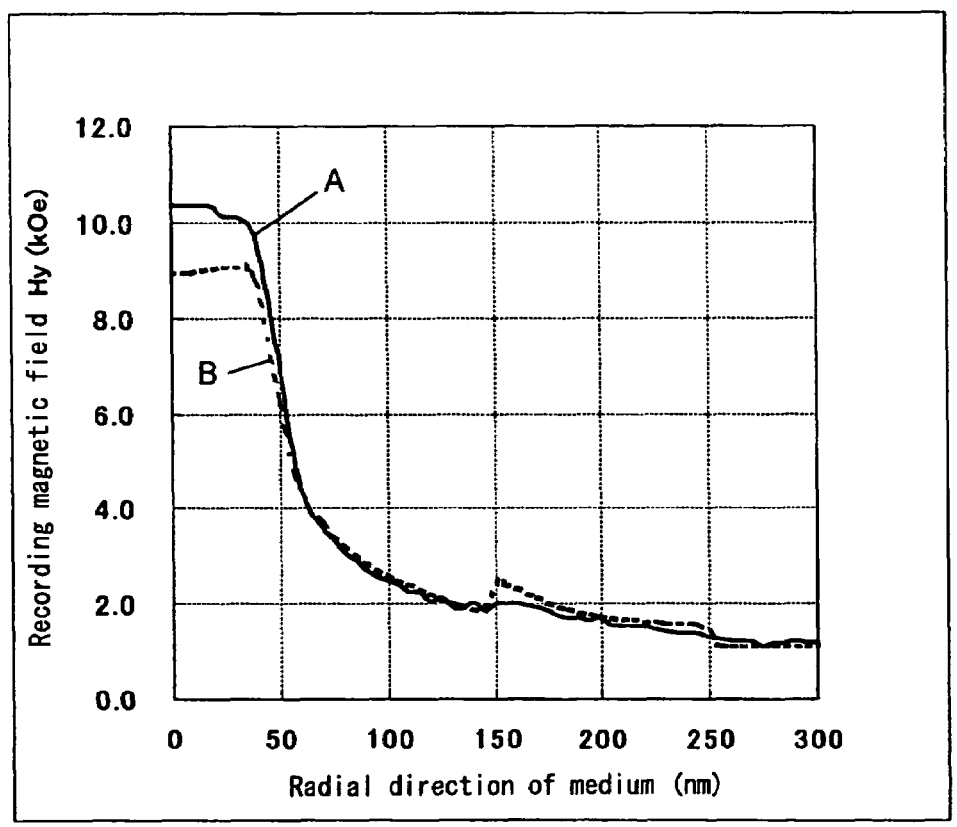
FIG. 6 is a graph showing the distribution of a recording magnetic field in the vicinity of the recording element located immediately under a magnetic head in simulation example 1 according to the present invention and comparative example 1.

Under the aforementioned conditions, a simulation was performed to obtain a recording magnetic field distribution as shown by a curve indicated by symbol "A" in FIG. 6.

FIG. 6 indicates the magnitude of a recording magnetic field on the medium surface. The horizontal axis of FIG. 6 represents the radial position on the magnetic recording medium 12, with point "O" indicating the center of the recording element 22A which is located immediately under the magnetic head 14, and to which the recording magnetic field is to be applied. A neighboring recording element 22A adjacent to the recording element 22A located immediately under the magnetic head 14 is present within a range of 150 to 250 nm along the horizontal axis.

COMPARATIVE EXAMPLE 1

In contrast to the aforementioned simulation example 1, another simulation model was prepared in which no upper soft magnetic layer 24 was formed. The magnetic head 14 was designed to fly at a height of 15 nm above the surface of the recording layer 22 in the magnetic recording medium 12. With the other conditions defined to be the same as those of the simulation example 1, a simulation was performed to obtain a recording magnetic field distribution as shown by a curve indicated by symbol "B" in FIG. 6.

As shown in FIG. 6, the simulation example 1 showed that the strength of the recording magnetic field on the recording element 22A immediately under the magnetic head 14 was greater than that of comparative example 1.

Furthermore, the comparative example 1 provided the recording magnetic field distribution in which the recording magnetic field was more intense at a neighboring recording element 22A adjacent to the recording element 22A located immediately under the magnetic head 14 than its surroundings. In contrast to this, the simulation example 1 showed that the recording magnetic field was not more intense at the neighboring recording element 22A than at its surroundings but tended to become monotonously weaker with distance from the recording element 22A located immediately under the magnetic head 14.

That is, it was found that when compared with the comparative example 1, the simulation example 1 reduced the power consumption of the magnetic head 14 and decreased to record information onto the neighboring recording element 22A and crosstalk, providing an enhanced areal density to the magnetic recording medium 12.

SIMULATION EXAMPLE 2

Figure 7:
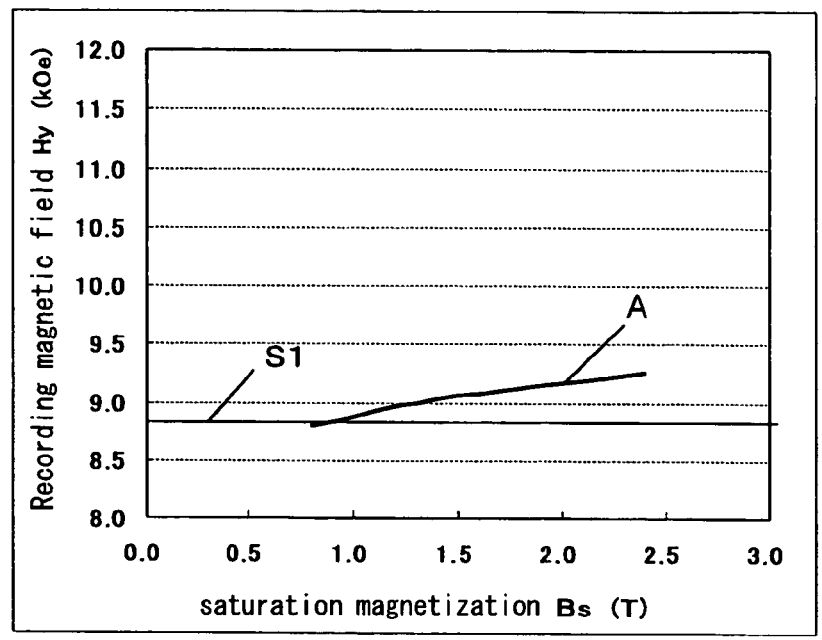
FIG. 7 is a graph showing the relation between the saturation magnetization in an upper soft magnetic layer and the magnitude of a recording magnetic field on the medium surface, in the vicinity of the center of the area located immediately under a magnetic head in simulation example 2 according to the present invention.

In contrast to the simulation model of the aforementioned simulation example 1, six types of simulation models were prepared in which the intermediate layer 20 had a thickness of 20 nm, and the upper soft magnetic layer 24 had a saturation magnetization of 0.8, 0.9, 1.0, 1.4, 1.8, and 2.4 T, respectively. The other conditions were the same as those of the simulation model according to the aforementioned simulation example 1. Simulations were performed on these simulation models to calculate the magnitude of a recording magnetic field on the medium surface, in the vicinity of the center of the area located immediately under the magnetic head 14, resulting in a curve indicated by symbol "A" in FIG. 7. In FIG. 7, also shown is a straight line indicated by symbol "S1" which represents the magnitude of a recording magnetic field on the medium surface required for recording operations on a typical perpendicular-recording type hard disc.

Figure 8:
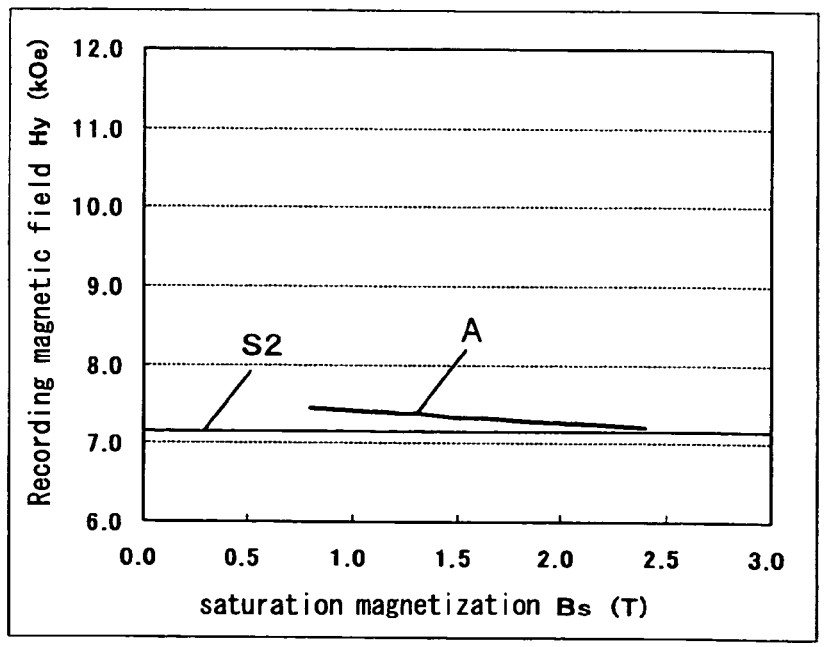
FIG. 8 is a graph showing the relation between the saturation magnetization in an upper soft magnetic layer and the magnitude of a recording magnetic field in the vicinity of the center of the lower surface of the recording element located immediately under a magnetic head in the simulation example 2.

The magnitude of the recording magnetic field in the vicinity of the center of the lower surface of the recording element 22A located immediately under the magnetic head 14 was calculated, resulting in a curve indicated by symbol "A" in FIG. 8. In FIG. 8, also shown is a straight line indicated by symbol "S2" which represents the magnitude of a recording magnetic field on the lower surface of the recording layer required for recording operations on a typical perpendicular-recording type hard disc.

As shown in FIGS. 7 and 8, it was confirmed that a recording magnetic field necessary for recording operations on a typical perpendicular-recording type hard disc could be obtained, with the saturation magnetization of the upper soft magnetic layer 24 being within a range of 0.8 to 2.4 T.

SIMULATION EXAMPLE 3

In addition to the simulation model according to the aforementioned simulation example 1, a plurality of simulation models were prepared which included the upper soft magnetic layer 24 having two types of saturation magnetization 0.8 T and 2.4 T and having thicknesses ranging from 0.2 to 5 nm. The other conditions were the same as those of the simulation model according to the aforementioned simulation example 1. Simulations were performed on these simulation models to calculate the magnitude of a recording magnetic field on the medium surface, in the vicinity of the center of the area located immediately under the magnetic head 14, resulting in curves indicated by symbols "A" and "B" in FIG. 9. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 2, FIG. 9 also shows a straight line indicated by symbol "S1" which represents the magnitude of a recording magnetic field on the medium surface required for recording operations on a typical perpendicular-recording type hard disc. The magnitude of the recording magnetic field in the vicinity of the center of the lower surface of the recording element 22A located immediately under the magnetic head 14 was calculated, resulting in curves indicated by symbols "A" and "B" in FIG. 10. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 2, FIG. 10 also shows a straight line indicated by symbol "S2" which represents the magnitude of a recording magnetic field on the lower surface of the recording layer required for recording operations on a typical perpendicular-recording type hard disc.

Figure 11:
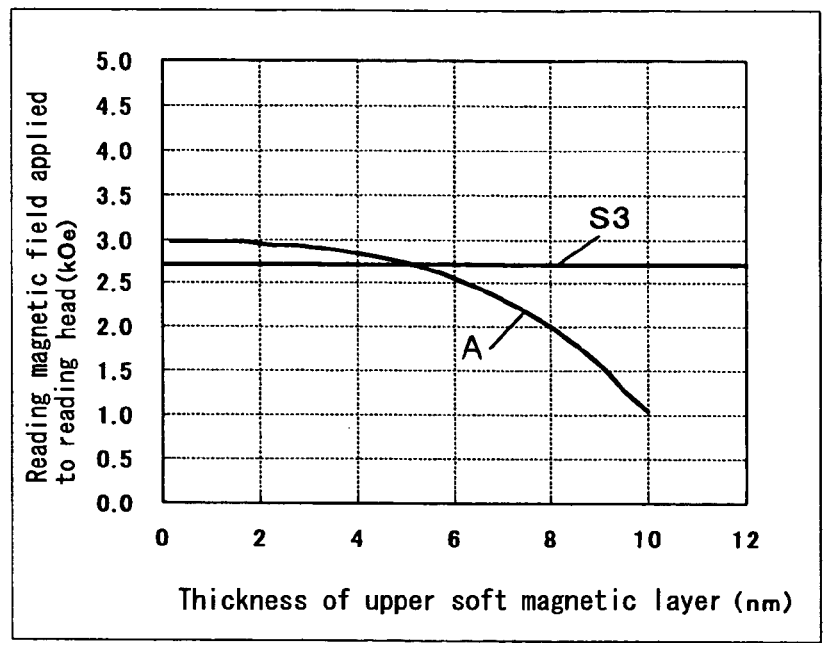
FIG. 11 is a graph showing the relation between the thickness of an upper soft magnetic layer and the magnitude of a reading magnetic field on a magnetic head in the simulation example 3.

For the simulation model with the upper soft magnetic layer 24 having a saturation magnetization of 1.4 T (the same model as that of the simulation example 1), the magnitude of a reading magnetic field on the magnetic head 14, given by the recording element 22A located immediately under the magnetic head 14 and applied to the magnetic head 14, was calculated resulting in a curve indicated by symbol "A" in FIG. 11. In FIG. 11, also shown is a straight line indicated by symbol "S3" which represents the magnitude of a reading magnetic field applied to the magnetic head required for ensuring reading operations by a typical perpendicular-recording type magnetic head.

Figure 9:
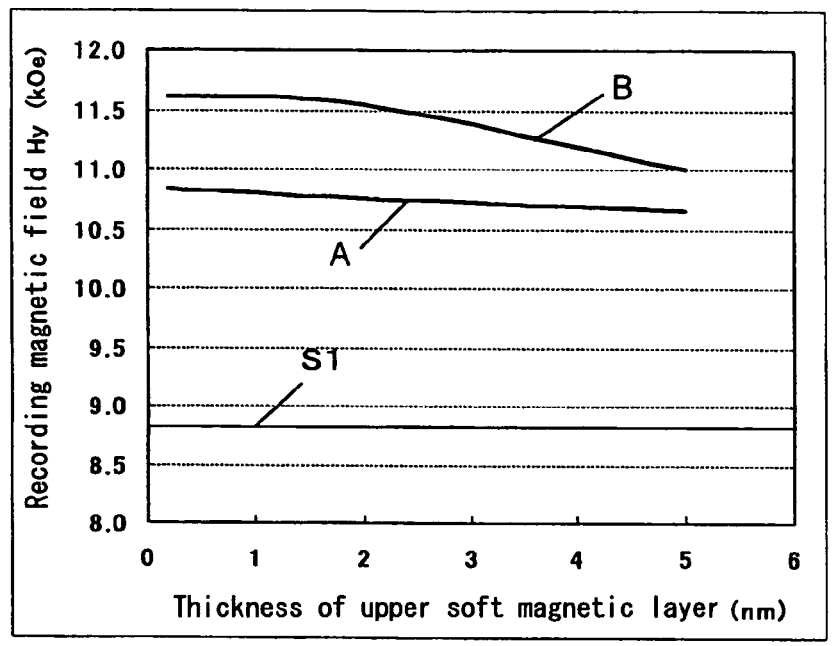
FIG. 9 is a graph showing the relation between the thickness of an upper soft magnetic layer and the magnitude of a recording magnetic field on the medium surface, in the vicinity of the center of the area located immediately under a magnetic head in simulation example 3 according to the present invention.
Figure 10:
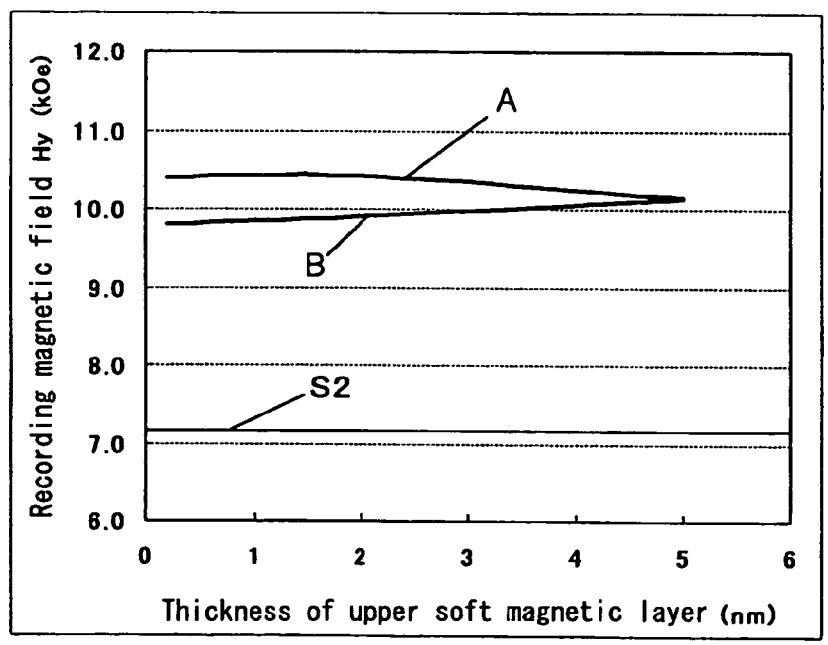
FIG. 10 is a graph showing the relation between the thickness of an upper soft magnetic layer and the magnitude of a recording magnetic field in the vicinity of the center of the lower surface of the recording element located immediately under a magnetic head in the simulation example 3.

As shown in FIGS. 9 and 10, it was confirmed that a recording magnetic field necessary for recording operations on a typical perpendicular-recording type hard disc could be obtained, with the upper soft magnetic layer 24 being within a range of 0.2 to 5 nm in thickness.

Furthermore, as shown in FIG. 11, it was also confirmed that with the upper soft magnetic layer 24 being 5 nm or less in thickness, a reading magnetic field could be obtained which was necessary to ensure reading operations by a typical perpendicular-recording type magnetic head. It is known that the intermediate layer 20 having greater thicknesses tends to provide more intense reading magnetic fields. Thus, the intermediate layer 20 being made greater than 5 nm in thickness would provide such a curve as would be obtained by translating the curve "A" of FIG. 11 upwardly. That is, with the intermediate layer 20 being 5 nm or more in thickness and the upper soft magnetic layer 24 being 5 nm or less in thickness, a reading magnetic field is obtained which is necessary to ensure reading operations by a typical perpendicular-recording type magnetic head.

On the other hand, with the upper soft magnetic layer 24 being less than 0.2 nm in thickness, the upper soft magnetic layer 24 would be equivalent or less than a single atom in size, and a good film is thus difficult to form. Accordingly, the upper soft magnetic layer 24 is preferably made 0.2 nm or more in thickness.

SIMULATION EXAMPLE 4

In contrast to the simulation model of the aforementioned simulation example 1, a plurality of simulation models were prepared which included the upper soft magnetic layer 24 having saturation magnetization 0.8 T and 2.4 T and the intermediate layer 20 having thicknesses ranging from 5 to 20 nm. The other conditions were the same as those of the simulation model of the aforementioned simulation example 1. Simulations were performed on these simulation models to calculate the magnitude of a recording magnetic field on the medium surface, in the vicinity of the center of the area located immediately under the magnetic head 14, resulting in curves indicated by symbols "A" and "B" in FIG. 12. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 2, FIG. 12 also shows a straight line indicated by symbol "S1" which represents the magnitude of a recording magnetic field on the medium surface required for recording operations on a typical perpendicular-recording type hard disc. The magnitude of the recording magnetic field in the vicinity of the center of the lower surface of the recording element 22A located immediately under the magnetic head 14 was calculated, resulting in curves indicated by symbols "A" and "B" in FIG. 13. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, FIG. 13 also shows a straight line indicated by symbol "S2" which represents the magnitude of a recording magnetic field on the lower surface of the recording layer required for recording operations on a typical perpendicular-recording type hard disc.

Figure 12:
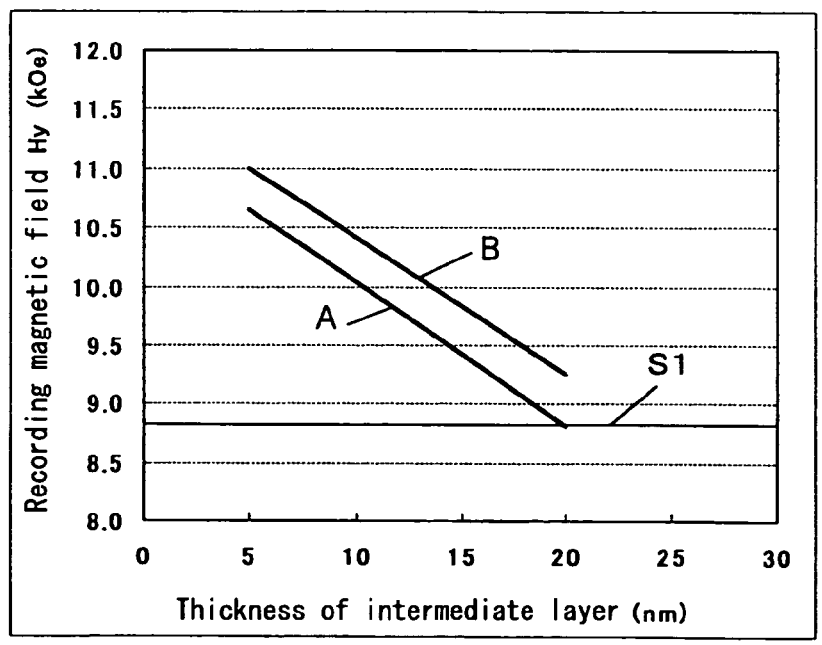
FIG. 12 is a graph showing the relation between the thickness of an intermediate layer and the magnitude of a recording magnetic field on the medium surface, in the vicinity of the center of the area located immediately under a magnetic head in simulation example 4 according to the present invention.
Figure 13:
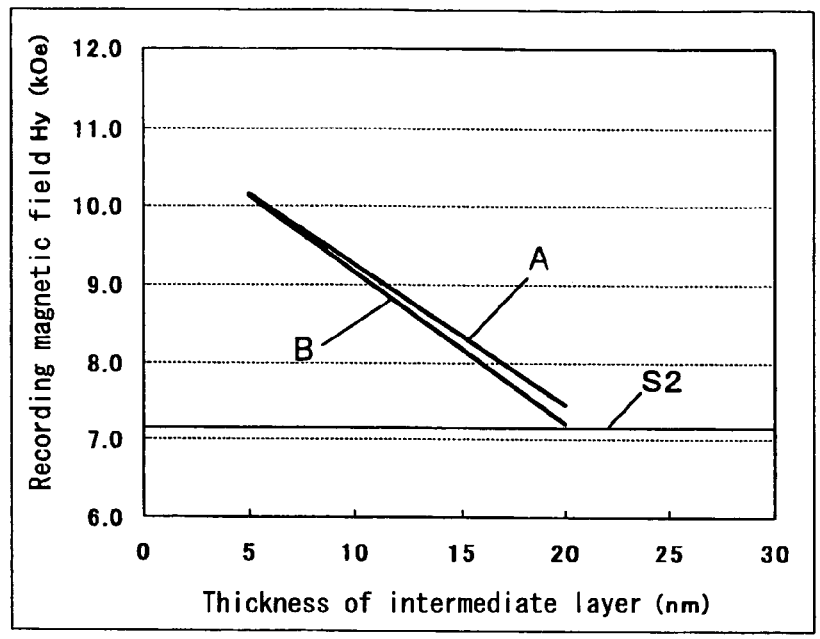
FIG. 13 is a graph showing the relation between the thickness of an intermediate layer and the magnitude of a recording magnetic field in the vicinity of the center of the lower surface of the recording element located immediately under a magnetic head in the simulation example 4.

As shown in FIGS. 12 and 13, it was confirmed that a recording magnetic field necessary for recording operations on a typical perpendicular-recording type hard disc is obtained, with the intermediate layer 20 being 20 nm or less in thickness.

SIMULATION EXAMPLE 5

Like the aforementioned simulation example 2, in contrast to the aforementioned simulation example 1, six types of simulation models were prepared in which the intermediate layer 20 had a thickness of 20 nm, and the upper soft magnetic layer 24 had a saturation magnetization of 0.8, 0.9, 1.0, 1.4, 1.8, and 2.4 T, respectively. Simulations were performed on these simulation models to calculate the magnitude of a recording magnetic field on the medium surface in the vicinity of the end portion of another neighboring recording element 22A adjacent to the recording element 22A located immediately under the magnetic head 14, resulting in a curve indicated by symbol "A" in FIG. 14.

Furthermore, in contrast to the aforementioned simulation example 1, a magnetic recording medium simulation model having no upper soft magnetic layer on the recording layer 22 was prepared. The magnetic head 14 was designed to fly at a height of 15 nm above the medium surface. With the other conditions being defined to be the same as those of the aforementioned simulation example 1, the simulation was performed to calculate the magnitude of the recording magnetic field in the vicinity of the end portion of another neighboring recording element 22A adjacent to the recording element 22A located immediately under the magnetic head 14, resulting in a straight line indicated by symbol "S4" in FIG. 14.

Figure 14:
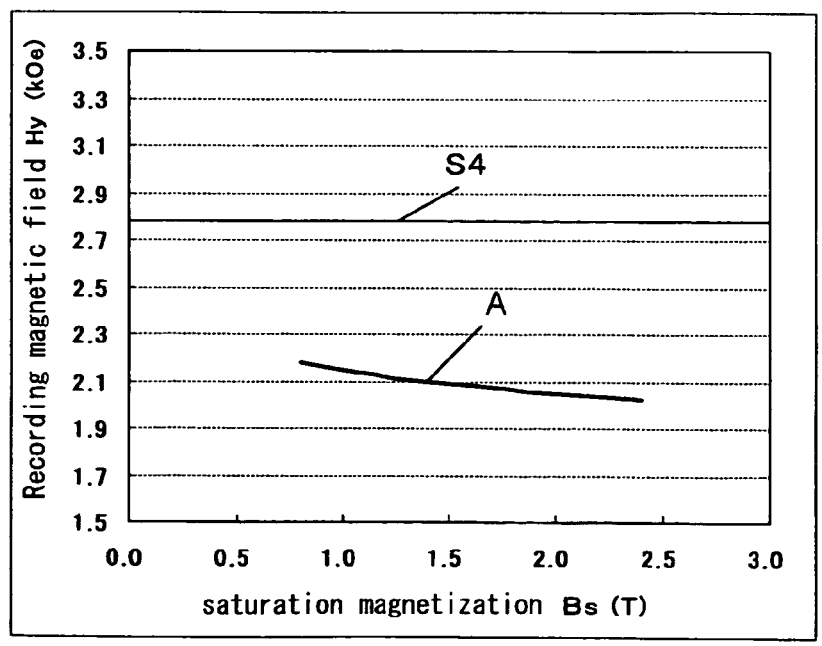
FIG. 14 is a graph showing the relation between the saturation magnetization in an upper soft magnetic layer and the magnitude of a recording magnetic field on the medium surface in the vicinity of the end portion of a recording element adjacent to the recording element located immediately under a magnetic head in simulation example 5 according to the present invention.

As shown in FIG. 14, the simulation example 5 shows that the magnitude of the recording magnetic field on the medium surface in the vicinity of the end portion of the another neighboring recording element 22A adjacent to the recording element 22A located immediately under the magnetic head 14 is reduced by 20% or more when compared with that of the magnetic recording medium having no upper soft magnetic layer on the recording layer 22. It was thus confirmed that recording information onto the neighboring recording element 22A and crosstalk could be significantly reduced when compared with the magnetic recording medium having no upper soft magnetic layer on the recording layer 22.

SIMULATION EXAMPLE 6

In contrast to the simulation model of the aforementioned simulation example 1, a plurality of simulation models were prepared which included the upper soft magnetic layer 24 having saturation magnetization 0.8 T and 2.4 T and having thicknesses ranging from 0.2 to 5 nm. The other conditions were the same as those of the simulation model according to the aforementioned simulation example 1. Simulations were performed on these simulation models to calculate the magnitude of a recording magnetic field on the medium surface in the vicinity of the end portion of another neighboring recording element 22A adjacent to the recording element 22A located immediately under the magnetic head 14, resulting in curves indicated by symbols "A" and "B" in FIG. 15. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the aforementioned simulation example 5, FIG. 15 also shows a straight line indicated by symbol "S4" which represents the magnitude of a recording magnetic field in the vicinity of the end portion of another neighboring recording element 22A adjacent to the recording element 22A located immediately under the magnetic head 14 in the magnetic recording medium having no upper soft magnetic layer on the recording layer 22.

Figure 15:
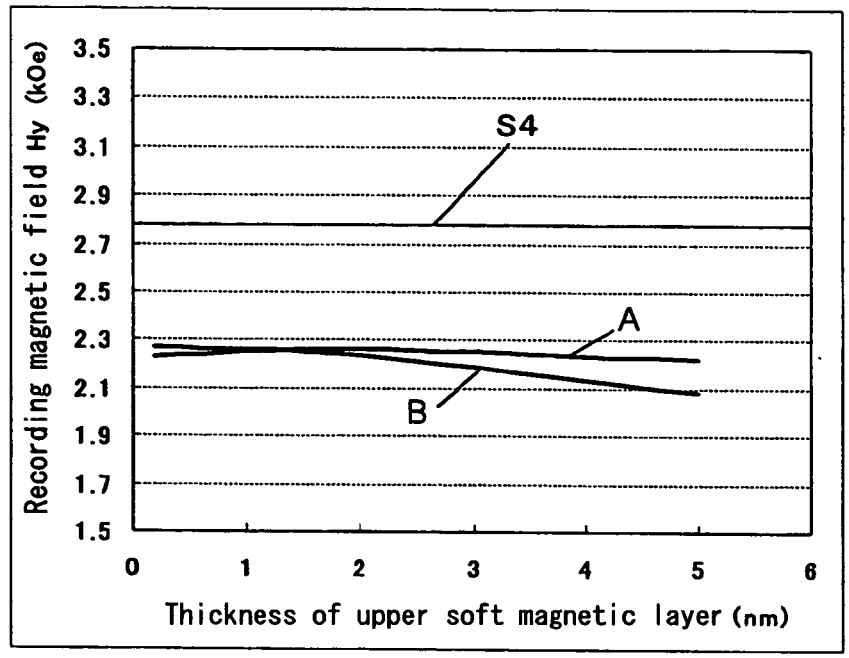
FIG. 15 is a graph showing the relation between the thickness of an upper soft magnetic layer and the magnitude of a recording magnetic field on the medium surface in the vicinity of the end portion of a recording element adjacent to the recording element located immediately under a magnetic head in simulation example 6 according to the present invention.

As shown in FIG. 15, the simulation example 6 also shows that the magnitude of the recording magnetic field on the medium surface in the vicinity of the end portion of the another neighboring recording element 22A adjacent to the recording element 22A located immediately under the magnetic head 14 is reduced by 20% or more when compared with that of the magnetic recording medium having no upper soft magnetic layer on the recording layer 22. It was thus confirmed that recording information onto the neighboring recording element 22A and crosstalk could be significantly reduced when compared with the magnetic recording medium having no upper soft magnetic layer on the recording layer 22.

SIMULATION EXAMPLE 7

In contrast to the simulation model of the aforementioned simulation example 1, a plurality of simulation models were prepared which included the upper soft magnetic layer 24 having saturation magnetization 0.8 T and 2.4 T and the intermediate layer 20 having thicknesses ranging from 5 to 20 nm. The other conditions were the same as those of the simulation model of the aforementioned simulation example 1. Simulations were performed on these simulation models to calculate the magnitude of a recording magnetic field on the medium surface in the vicinity of the end portion of another neighboring recording element 22A adjacent to the recording element 22A located immediately under the magnetic head 14, resulting in curves indicated by symbols "A" and "B" in FIG. 16. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the aforementioned simulation example 5, FIG. 16 also shows a straight line indicated by symbol "S4" which represents the magnitude of a recording magnetic field in the vicinity of the end portion of the another neighboring recording element 22A adjacent to the recording element 22A located immediately under the magnetic head 14 in the magnetic recording medium having no upper soft magnetic layer on the recording layer 22.

Figure 16:
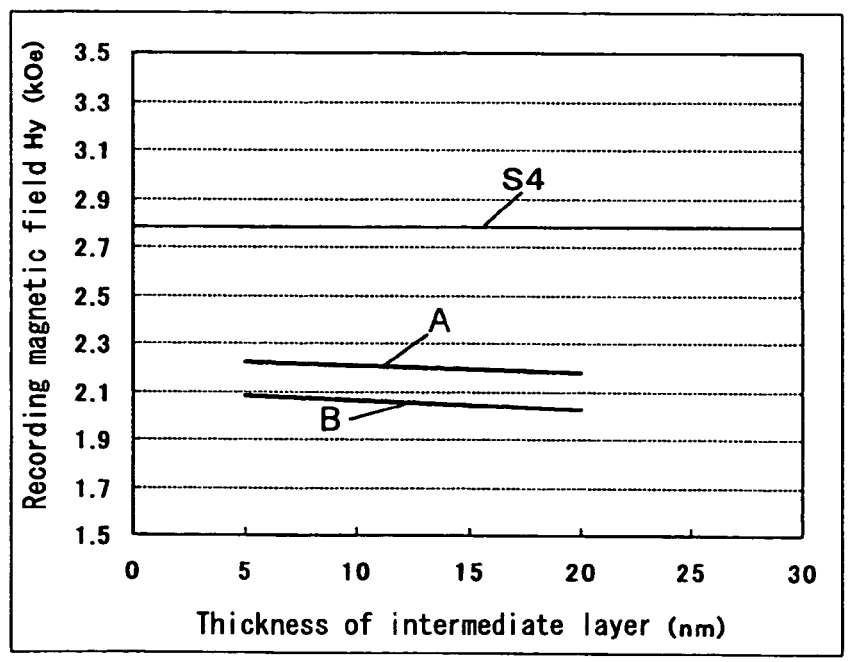
FIG. 16 is a graph showing the relation between the thickness of an intermediate layer and the magnitude of a recording magnetic field on the medium surface in the vicinity of the end portion of a recording element adjacent to the recording element located immediately under a magnetic head in simulation example 7 according to the present invention.

As shown in FIG. 16, the simulation example 7 also shows that the magnitude of the recording magnetic field on the medium surface in the vicinity of the end portion of the another neighboring recording element 22A adjacent to the recording element 22A located immediately under the magnetic head 14 is reduced by 20% or more when compared with that of the magnetic recording medium having no upper soft magnetic layer on the recording layer 22. It was thus confirmed that recording information onto the neighboring recording element 22A and crosstalk could be significantly reduced when compared with the magnetic recording medium having no upper soft magnetic layer on the recording layer 22.

SIMULATION EXAMPLE 8

In accordance with the aforementioned third exemplary embodiment, a simulation model of the magnetic recording device 40 was prepared which had the longitudinal recording type magnetic recording medium 42. More specifically, the conditions of the simulation model were defined as follows:

Track pitch of the recording layer 44 in the magnetic recording medium 42=200 nm (the side-by-side radial pitch of the recording elements 44A);

Radial width of the recording element 44A=100 nm;

Radial width of a concave portion between the recording elements 44A=100 nm;

Thickness of the recording layer 44=25 nm;

Thickness of the upper soft magnetic layer 24=5 nm;

Thickness of the intermediate layer 20=20 nm;

Width of the recording magnetic pole of the magnetic head 46=100 nm;

Magneto-motive force applied to the magnetic head 46=0.2 AT; and

Flying height for the magnetic head 46=15 nm (the height by which the magnetic head 46 is spaced apart from the surface of the upper soft magnetic layer 24 in the magnetic recording medium 42).

Figure 17:
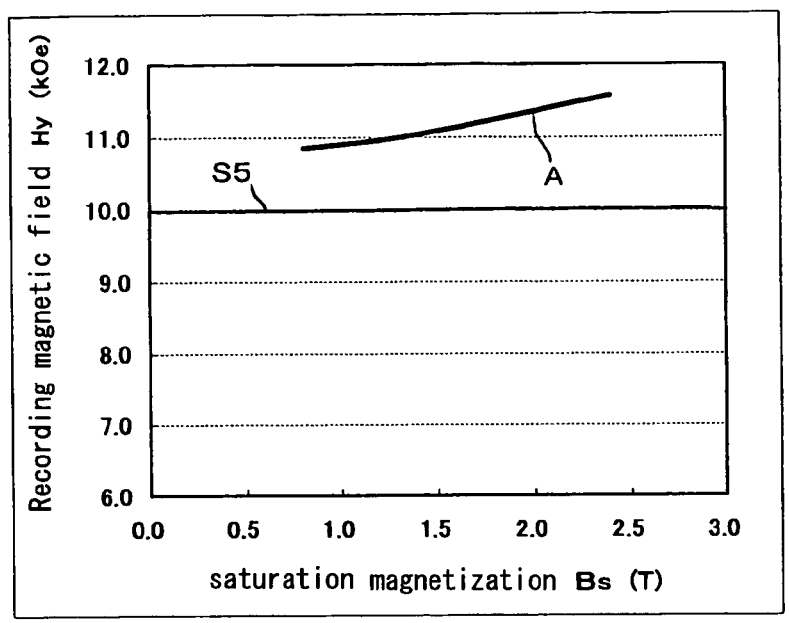
FIG. 17 is a graph showing the relation between the saturation magnetization in an upper soft magnetic layer and the magnitude of a recording magnetic field on the medium surface, in the vicinity of the center of the area located immediately under a magnetic head in simulation example 8 according to the present invention.

Six types of simulation models were prepared which included the upper soft magnetic layer 24 having a saturation magnetization of 0.8, 0.9, 1.0, 1.4, 1.8, and 2.4 T, respectively, in addition to the aforementioned conditions. Simulations were performed on these simulation models to calculate the magnitude of a recording magnetic field on the medium surface, in the vicinity of the center of the area located immediately under the magnetic head 46, resulting in a curve indicated by symbol "A" in FIG. 17. In FIG. 17, also shown is a straight line indicated by symbol "S5" which represents the magnitude of a recording magnetic field on the medium surface required for recording operations on a typical longitudinal recording type hard disc.

Figure 18:
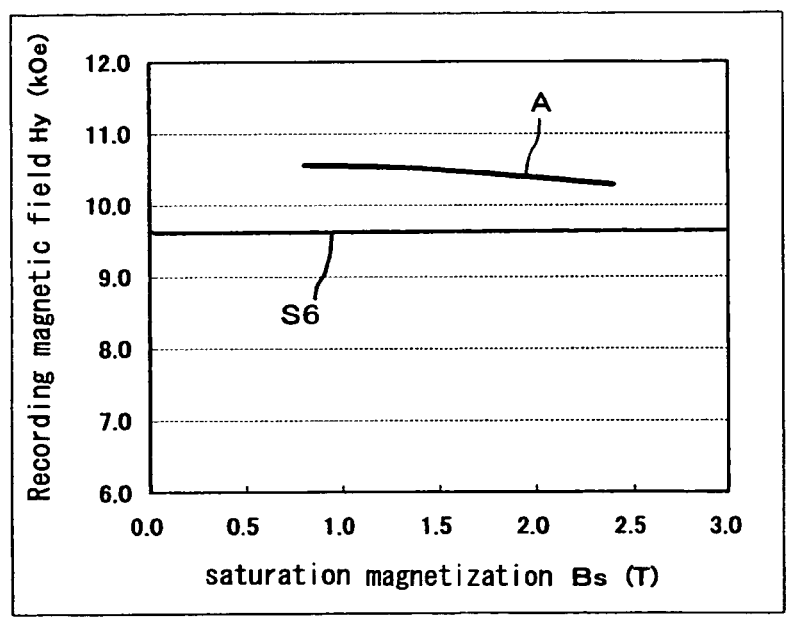
FIG. 18 is a graph showing the relation between the saturation magnetization in an upper soft magnetic layer and the magnitude of a recording magnetic field in the vicinity of the center of the lower surface of the recording element located immediately under a magnetic head in the simulation example 8.

The magnitude of a recording magnetic field in the vicinity of the center of the lower surface of the recording element 44A located immediately under the magnetic head 46 was calculated, resulting in a curve indicated by symbol "A" in FIG. 18. In FIG. 18, also shown is a straight line indicated by symbol "S6" which represents the magnitude of a recording magnetic field on the lower surface of the recording layer required for recording operations on a typical longitudinal recording type hard disc.

As shown in FIGS. 17 and 18, it was confirmed that a recording magnetic field necessary for recording operations on a typical longitudinal recording type hard disc could be obtained, with the saturation magnetization of the upper soft magnetic layer 24 being within a range of 0.8 to 2.4 T.

SIMULATION EXAMPLE 9

In contrast to the two types of simulation models with the upper soft magnetic layer 24 having a saturation magnetization of 0.8 T and 2.4 T, respectively, among the simulation models of the aforementioned simulation example 8, a plurality of simulation models were prepared which included the upper soft magnetic layer 24 having thicknesses ranging from 0.2 to 5 nm. The other conditions were the same as those of the simulation model of the aforementioned simulation example 8. Simulations were performed on these simulation models to calculate the magnitude of a recording magnetic field on the medium surface, in the vicinity of the center of the area located immediately under the magnetic head 46, resulting in curves indicated by symbols "A" and "B" in FIG. 19. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 8, FIG. 19 also shows a straight line indicated by symbol "S5" which represents the magnitude of a recording magnetic field on the medium surface required for recording operations on a typical longitudinal recording type hard disc.

Figure 20:
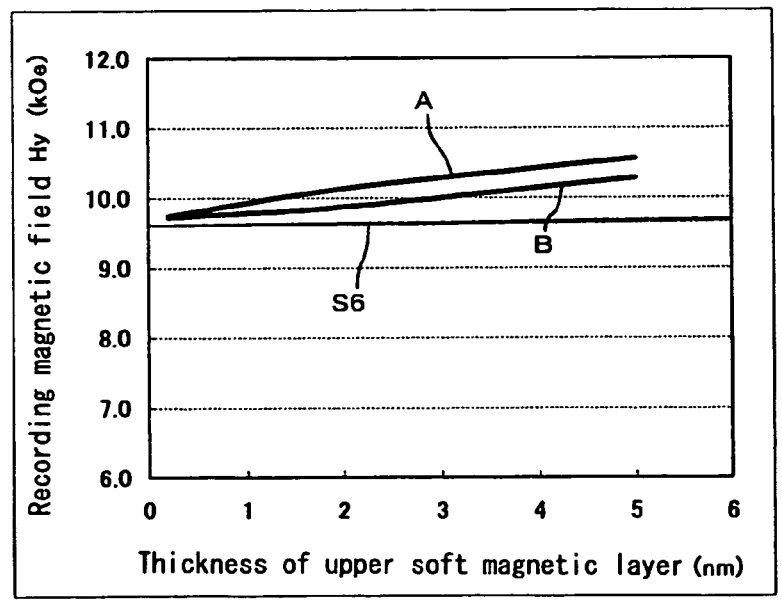
FIG. 20 is a graph showing the relation between the thickness of an upper soft magnetic layer and the magnitude of a recording magnetic field in the vicinity of the center of the lower surface of the recording element located immediately under a magnetic head in the simulation example 9.

The magnitude of the recording magnetic field in the vicinity of the center of the lower surface of the recording element 44A located immediately under the magnetic head 46 was calculated, resulting in curves indicated by symbols "A" and "B" in FIG. 20. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 8, FIG. 20 also shows a straight line indicated by symbol "S6" which represents the magnitude of a recording magnetic field on the lower surface of the recording layer required for recording operations on a typical longitudinal recording type hard disc.

Figure 21:
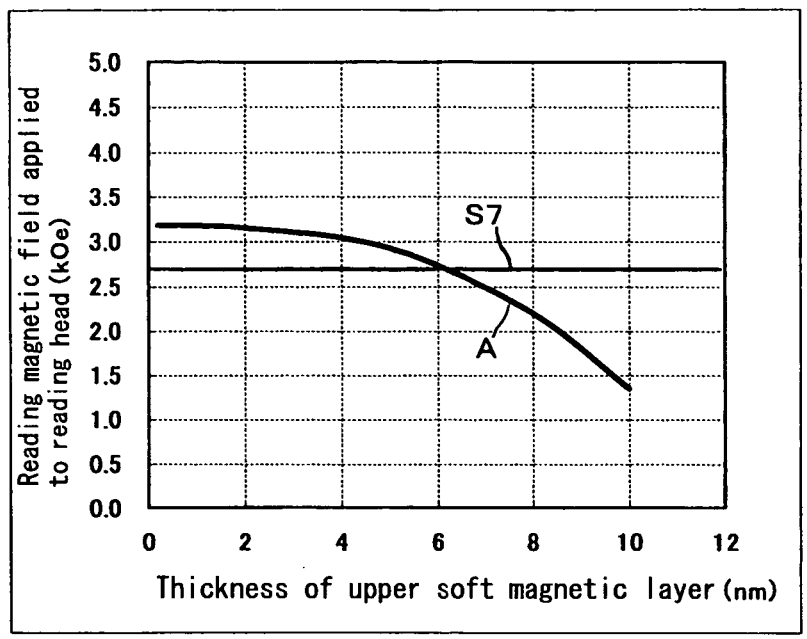
FIG. 21 is a graph showing the relation between the thickness of an upper soft magnetic layer and the magnitude of a reading magnetic field on a magnetic head in the simulation example 9.

For one of the simulation models of the aforementioned simulation example 8 with the upper soft magnetic layer 24 having a saturation magnetization of 1.4 T, the magnitude of a reading magnetic field on the magnetic head 46, given by the recording element 44A located immediately under the magnetic head 46 and applied to the magnetic head 46, was calculated resulting in a curve indicated by symbol "A" in FIG. 21. In FIG. 21, also shown is a straight line indicated by symbol "S7" which represents the magnitude of a reading magnetic field applied to the magnetic head required for ensuring reading operations by a typical longitudinal recording type magnetic head.

Figure 19:
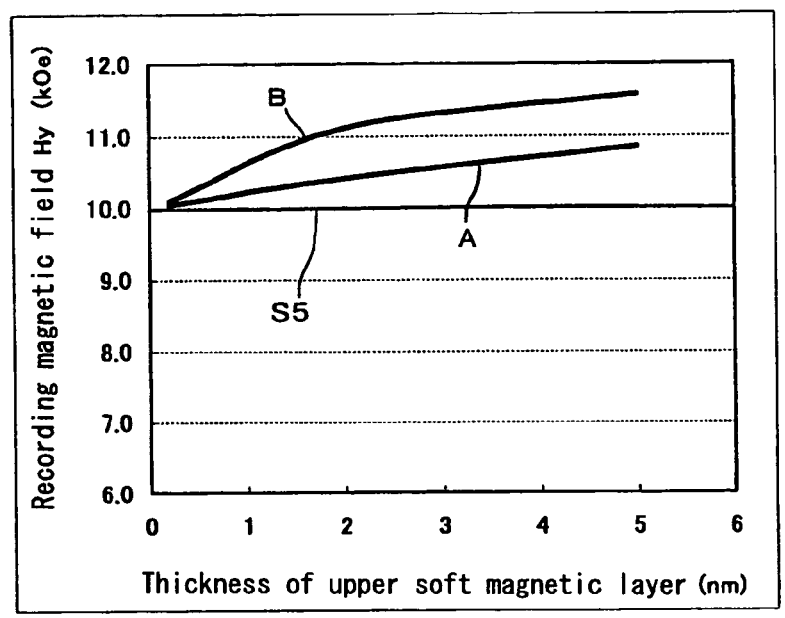
FIG. 19 is a graph showing the relation between the thickness of an upper soft magnetic layer and the magnitude of a recording magnetic field on the medium surface, in the vicinity of the center of the area located immediately under a magnetic head in simulation example 9 according to the present invention.

As shown in FIGS. 19 and 20, it was confirmed that a recording magnetic field necessary for recording operations on a typical longitudinal recording type hard disc could be obtained, with the upper soft magnetic layer 24 being within a range of 0.2 to 5 nm in thickness.

Furthermore, as shown in FIG. 21, it was confirmed that with the upper soft magnetic layer 24 being 6 nm or less in thickness, a reading magnetic field could be obtained which was necessary to ensure reading operations by a typical longitudinal recording type magnetic head. Since the longitudinal recording type magnetic recording medium 42 is not provided with the lower soft magnetic layer, the reading magnetic field applied to the magnetic head 46 would not vary in magnitude even in the presence of a change in thickness of the intermediate layer 20. Accordingly, like the simulation example 3 related to the perpendicular-recording type magnetic recording/reading device, the longitudinal recording type magnetic recording/reading device also ensures a reading magnetic field necessary to insure reading operations by the magnetic head, with the upper soft magnetic layer 24 being 5 nm or less(within a range of 6 nm or less) in thickness. It is thus found that for both the perpendicular recording type and the longitudinal recording type devices, the upper soft magnetic layer 24 is preferably 5 nm or less in thickness.

On the other hand, with the upper soft magnetic layer 24 being less than 0.2 nm in thickness, the upper soft magnetic layer 24 would be equivalent or less than a single atom in size, and a good film is thus difficult to form. Accordingly, the upper soft magnetic layer 24 is preferably made 0.2 nm or more in thickness.

SIMULATION EXAMPLE 10

Figure 22:
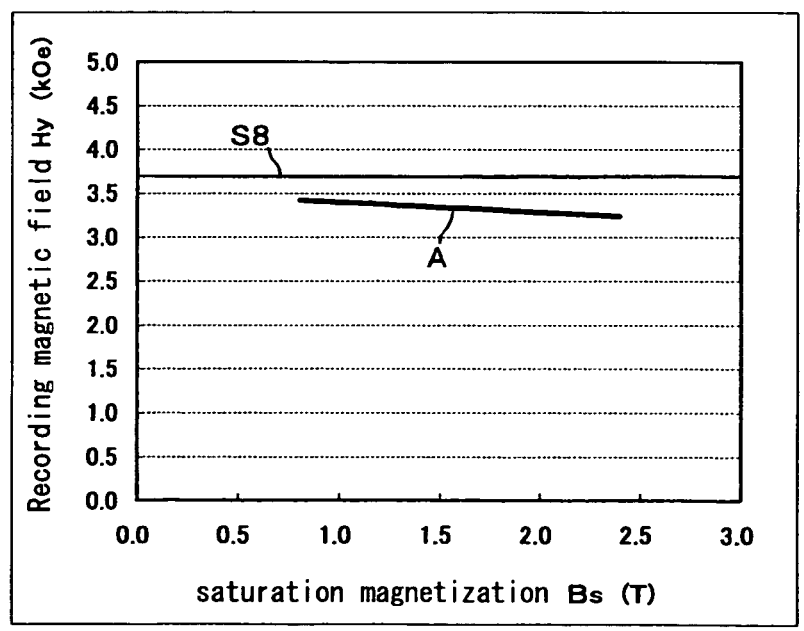
FIG. 22 is a graph showing the relation between the saturation magnetization in an upper soft magnetic layer and the magnitude of a recording magnetic field on the medium surface in the vicinity of the end portion of a recording element adjacent to the recording element located immediately under a magnetic head in simulation example 10 according to the present invention.

A simulation was performed on the simulation model of the aforementioned simulation example 8 to calculate the magnitude of a recording magnetic field on the medium surface in the vicinity of the end portion of another neighboring recording element 44A adjacent to the recording element 44A located immediately under the magnetic head 46, resulting in a curve indicated by symbol "A" in FIG. 22.

Furthermore, in contrast to the aforementioned simulation example 8, a magnetic recording medium simulation model having no upper soft magnetic layer on the recording layer 44 was prepared. The magnetic head 46 was designed to fly at a height of 15 nm above the medium surface. With the other conditions being defined to be the same as those of the aforementioned simulation example 8, the simulation was performed to calculate the magnitude of the recording magnetic field in the vicinity of the end portion of the another neighboring recording element 44A adjacent to the recording element 44A located immediately under the magnetic head 46, resulting in a curve indicated by symbol "S8" in FIG. 22.

As shown in FIG. 22, the simulation example 10 shows that the magnitude of the recording magnetic field on the medium surface in the vicinity of the end portion of the another neighboring recording element 44A adjacent to the recording element 44A located immediately under the magnetic head 46 is reduced to be less than that of the magnetic recording medium having no upper soft magnetic layer on the recording layer 44. It was thus confirmed that recording information onto the neighboring recording element 44A and crosstalk could be reduced when compared with the magnetic recording medium having no upper soft magnetic layer on the recording layer 44.

SIMULATION EXAMPLE 11

In contrast to the simulation model of the aforementioned simulation example 8, a plurality of simulation models were prepared which included the upper soft magnetic layer 24 having saturation magnetization 0.8 T and 2.4 T and having thicknesses ranging from 0.2 to 5 nm. The other conditions were the same as those of the simulation model of the aforementioned simulation example 8. Simulations were performed on these simulation models to calculate the magnitude of the recording magnetic field on the medium surface in the vicinity of the end portion of another neighboring recording element 44A adjacent to the recording element 44A located immediately under the magnetic head 46, resulting in curves indicated by symbols "A" and "B" in FIG. 23. The curve indicated by symbol "A" shows the upper soft magnetic layer 24 having a saturation magnetization of 0.8 T, while the curve indicated by symbol "B" shows the upper soft magnetic layer 24 having a saturation magnetization of 2.4 T. Additionally, like the simulation example 10, FIG. 23 also shows a straight line indicated by symbol "S8" which represents the magnitude of a recording magnetic field in the vicinity of the end portion of another neighboring recording element 44A adjacent to the recording element 44A located immediately under the magnetic head 46 in the magnetic recording medium having no upper soft magnetic layer on the recording layer 44.

Figure 23:
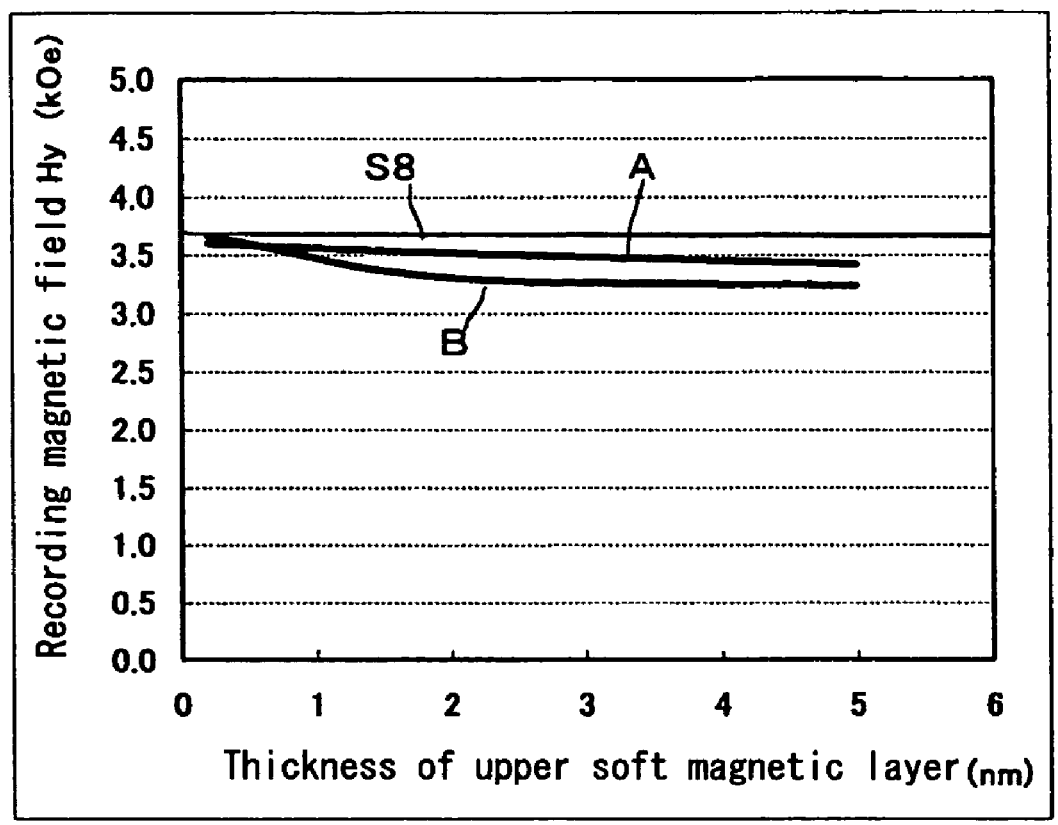
FIG. 23 is a graph showing the relation between the thickness of an upper soft magnetic layer and the magnitude of a recording magnetic field on the medium surface in the vicinity of the end portion of a recording element adjacent to the recording element located immediately under a magnetic head in simulation example 11 according to the present invention.

As shown in FIG. 23, the simulation example 11 also shows that the magnitude of the recording magnetic field on the medium surface in the vicinity of the end portion of the another neighboring recording element 44A adjacent to the recording element 44A located immediately under the magnetic head 46 is reduced to be less than that of the magnetic recording medium having no upper soft magnetic layer on the recording layer 44. It was thus confirmed that recording information onto the neighboring recording element 44A and crosstalk could be reduced when compared with the magnetic recording medium having no upper soft magnetic layer on the recording layer 44.

The present invention is applicable to a magnetic recording medium with a recording layer formed in a concavo-convex pattern.

What is claimed is:

1. A magnetic recording medium with a recording layer formed in a predetermined concavo-convex pattern, wherein
the recording layer is a perpendicular recording layer designed to be magnetized in a direction of thickness,
a lower soft magnetic layer is formed between the recording layer and a substrate,
an upper soft magnetic layer is formed over concave and convex portions of the concavo-convex pattern uniformly along a plane including an upper surface of the recording layer, and
the upper soft magnetic layer has a saturation magnetization ranging from 0.8 to 2.4 T and a thickness of 0.2 to 5 nm.

2. The magnetic recording medium according to claim 1, wherein
a non-magnetic intermediate layer with a thickness of 5 to 2 nm is formed between the recording layer and the lower soft magnetic layer.

3. A magnetic recording device comprising:
the magnetic recording medium according to claim 1; and
a magnetic head for recording and reading operations on the magnetic recording medium.

\* \* \* \* \*

UNITED STATES PATENT AND TRADEMARK OFFICE
CERTIFICATE OF CORRECTION

PATENT NO.         : 7,368,184 B2  
APPLICATION NO. : 10/948322  
DATED              : May 6, 2008  
INVENTOR(S)       : Akimasa Kaizu and Yoshikazu Soeno It is certified that error appears in the above-identified patent and that said Letters Patent is hereby corrected as shown below:

Column 20, Line 28

Change: "2" to --20--.

Signed and Sealed this

Twelfth Day of August, 2008

JON W. DUDAS  
*Director of the United States Patent and Trademark Office*